US012600502B2

(12) United States Patent
Stein

(10) Patent No.: US 12,600,502 B2
(45) Date of Patent: Apr. 14, 2026

(54) NEURAL NETWORK-GUIDED PASSIVE SENSOR DRONE INSPECTION SYSTEM

(71) Applicant: DROBOTICS LLC, Saint Petersburg, FL (US)

(72) Inventor: Eyal Stein, Sharon, MA (US)

(73) Assignee: Drobotics, LLC, St. Petersburg, FL (US)

(*) Notice: Subject to any disclaimer, the term of this patent is extended or adjusted under 35 U.S.C. 154(b) by 272 days.

(21) Appl. No.: 17/896,451

(22) Filed: Aug. 26, 2022

(65) Prior Publication Data

US 2023/0061934 A1 Mar. 2, 2023

Related U.S. Application Data

(60) Provisional application No. 63/237,188, filed on Aug. 26, 2021.

(51) Int. Cl.
*B64U 10/13* (2023.01)
*G01M 99/00* (2011.01)
(Continued)

(52) U.S. Cl.
CPC ........... *B64U 10/13* (2023.01); *G01M 99/005* (2013.01); *G01S 19/47* (2013.01); *G06N 3/08* (2013.01);
(Continued)

(58) Field of Classification Search
CPC .... B64C 39/024; G01M 99/005; G01S 19/47; G06N 3/08; H02N 11/002; B64U 2201/10; B64U 2201/20; B64U 2101/00
See application file for complete search history.

(56) References Cited

U.S. PATENT DOCUMENTS 9,778,653 B1 10/2017 McClintock et al.
9,964,951 B1 * 5/2018 Dunn ..................... G06V 20/17
(Continued)

FOREIGN PATENT DOCUMENTS

JP 2011126417 A * 6/2011
KR 102108658 B1 5/2020
KR 102253488 B1 5/2021

OTHER PUBLICATIONS

International Search Report and Written Opinion for International Application No. PCT/US2022/041657.

*Primary Examiner* — Rachid Bendidi
*Assistant Examiner* — Joseph Anderson Yanoska
(74) *Attorney, Agent, or Firm* — Jacob W. Neu; Bradley Arant Boult Cummings LLP

(57) ABSTRACT

A drone system for collecting structural condition data about a structure having an array of sensors disposed at various locations on the structure and methods of using such a drone system are disclosed herein. The drone inspection system leverages neural networks to calculate a drone flight path to classify the location of passive sensors and calculate a drone flight path to collect structural condition data about the structure using line of sight sensors for digital twin generation. Some of the sensors disposed on the structure may be passive sensors that comprise energy harvesters and must be energized to report the structural collection data to the drone. The drone inspection system may comprise an energy transfer module for energizing the passive sensor via the energy harvester.

31 Claims, 8 Drawing Sheets

(51) Int. Cl.
  *G01S 19/47*      (2010.01)
  *G06N 3/08*       (2023.01)
  *H02N 11/00*      (2006.01)
  *B64U 101/26*     (2023.01)

(52) U.S. Cl.
  CPC ....... *H02N 11/002* (2013.01); *B64U 2101/26*
      (2023.01); *B64U 2201/10* (2023.01); *B64U*
                                  *2201/20* (2023.01)

(56)            References Cited

U.S. PATENT DOCUMENTS

| | | | | |
|---|---|---|---|---|
| 10,593,109 | B1 * | 3/2020 | Floyd | G06Q 40/08 |
| 11,087,632 | B1 * | 8/2021 | Yarlagadda | G05D 1/102 |
| 11,131,597 | B1 * | 9/2021 | Oakes, III | G06T 17/00 |
| 11,783,715 | B2 | 10/2023 | Stein | |
| 12,039,872 | B2 | 7/2024 | Stein | |
| 12,154,440 | B2 | 11/2024 | Stein | |
| 2002/0154029 | A1 * | 10/2002 | Watters | G01D 5/48 |
| | | | | 340/870.07 |
| 2017/0039861 | A1 | 2/2017 | Ceribelli et al. | |
| 2017/0192418 | A1 | 7/2017 | Bethke et al. | |
| 2018/0082682 | A1 * | 3/2018 | Erickson | G10L 15/30 |
| 2018/0188728 | A1 * | 7/2018 | Erickson | G05D 1/104 |
| 2018/0203470 | A1 * | 7/2018 | Pattison | G05D 1/12 |
| 2018/0204469 | A1 * | 7/2018 | Moster | G08G 5/34 |
| 2019/0055015 | A1 * | 2/2019 | Allard | G05D 1/0038 |
| 2019/0368133 | A1 * | 12/2019 | Joshi | G06T 7/11 |
| 2020/0039373 | A1 * | 2/2020 | Cantrell | H02J 50/90 |
| 2020/0072744 | A1 * | 3/2020 | Al Shehri | G01N 21/55 |
| 2020/0119805 | A1 * | 4/2020 | Miyakawa | B64D 27/24 |
| 2020/0159252 | A1 | 5/2020 | Giuffrida et al. | |
| 2021/0067923 | A1 * | 3/2021 | Stein | H04L 67/12 |
| 2021/0089811 | A1 * | 3/2021 | Strong | G06V 20/176 |
| 2021/0301536 | A1 * | 9/2021 | Baggs | H04W 4/80 |
| 2021/0359891 | A1 * | 11/2021 | Lee | H04B 7/0456 |
| 2022/0111960 | A1 * | 4/2022 | Tran | A01G 7/00 |
| 2022/0390964 | A1 * | 12/2022 | Youmans | G05D 1/0027 |

* cited by examiner

NEURAL NETWORK-GUIDED PASSIVE SENSOR DRONE INSPECTION SYSTEM

CROSS-REFERENCE TO RELATED APPLICATIONS

This application claims the benefit of filing of U.S. Provisional Patent Application No. 63/237,188 filed on Aug. 26, 2021, which is incorporated by reference herein.

TECHNICAL FIELD

The present disclosure is directed toward drone inspection systems. Specifically, the present disclosure is related to neural-network guided drone inspection systems for inspecting structures or other large-scale assets with sensors attached to the surface or otherwise incorporated into the structure or asset.

BACKGROUND OF THE ART

A drone, also known as an unmanned aerial vehicle (UAV), unmanned aerial system (UAS), or remotely piloted aircraft, is a flight vehicle without a human pilot aboard. Its path is controlled either autonomously by onboard computers or by the remote control of a pilot on the ground or in another vehicle. Drones have proliferated in number as recognition of their widespread and diverse commercial potential has increased.

Drones are frequently used to inspect structures (e.g., a radio tower, crane, building, statue, etc.) or other large-scale permanent or semi-permanent assets to determine the state of the structure or asset. (To avoid redundancy, "structure" will be used throughout this disclosure but will be understood to incorporate any kind of large-scale structure, asset, or thing being inspected. Such structures typically require occasional monitoring and maintenance that may be difficult for direct human monitoring because the structure is either too large, too tall, or too remote. Some nonlimiting examples of such structures include cell phone towers, radio towers, bridges, oil rigs, offshore platforms, pipelines, wind turbines, electrical poles or facilities, refineries, remote aboveground storage tanks, etc.) For example, the structure may be inspected to identify any corrosion or any cracks or stresses in joints. These drone inspection systems may make use of global positioning system (GPS) navigation functions, e.g., using GPS waypoints for navigation, to lead the drone to or around structures that it will inspect. The drones often follow preprogrammed flight paths either created by the drone operator prior to performing the structure inspection, or by a computer processor on the drone or remotely from the drone based on the configuration of the structure. Drone systems may utilize a variety of onboard sensors (including one or more cameras, radiofrequency (RF) sensors, etc.) to monitor the operating environment, follow a path to a structure to be inspected, and perform the inspection.

Despite the presence of these sensors, the drone may not be equipped to use the data provided by these sensors to react to unplanned changes in flight path (e.g., to avoid unexpected obstacles or perform collision-avoidance maneuvers) or adapt to GPS drift that can affect waypoint accuracy. GPS drifts occur when a preprogrammed flight path fails to account for GPS drift vector calibrations and corrections. When the operator or processor defines a flight plan with way points in the absence of such corrections, for example, the navigation system may take the drone off-course: even a small deviation may take all or part of the structure of interest outside the preprogrammed flight path and, consequently, the field of view of the onboard sensors. Conventional drones may also fail to react to anomalies or unexpected conditions in the operating environment. The drone may cease collecting information, for example, if sensor readings fall below preset trigger thresholds, or may over-collect data if it veers off course and begins recording sensor data before the target is actually reached.

In some drone inspection systems, the drones are controlled by an operator within the drone's line of sight. This requires the presence of personnel at the site of each inspection as wells as close, sustained attention to the drone's flight. The drone must closely approach each region of the structure requiring inspection, and these regions may not be fully known until data is initially gathered and the inspection actually begins. The drone must also maintain a safe distance from the structure and steer around obstacles in its approach, notwithstanding wind and weather conditions. The task of operating the drone safely and efficiently may be particularly challenging when inspecting a large installation (such as a power station) that includes many structures.

Furthermore, drones can only inspect what they can "see," meaning only things that are within line of sight of the drone's mounted sensors. ("See" in this sense means within a hypothetical line of sight from a given position of the drone and is not limited to optical sensors, but may include both optical and non-optical sensors, e.g., RGB cameras, thermal sensors, multispectral sensors, etc.). If there is corrosion on the back side of a panel (in this case under paint coatings or insulation) that is not within line of sight of the drone's mounted sensors, the drone sensors will miss this information.

Accordingly, there remains a need in the art for a neural-network guided drone inspection system for inspecting structures having passive sensors. There also remains a need in the art for a neural-network guided drone inspection system capable of identifying passive sensors and energizing such sensors to collect data from them.

SUMMARY OF THE INVENTION

In some respects, the disclosure concerns a system for collecting structural condition data of a structure having an array of passive sensors at various locations on the structure, each passive sensor energized by an energy harvester, the system including a drone having an onboard neural compute engine; an energy transfer module targetable to energize an energy harvester such that when energized, the energy harvester energizes a passive sensor; and a communications device for receiving data from an energized sensor, wherein the neural compute engine is configured for obstacle avoidance and for identifying a line of sight between the energy transfer module and the sensor's energy harvester.

Other aspects of the invention are described further with respect to the detailed description and the claims

BRIEF DESCRIPTIONS OF THE DRAWINGS

FIG. 1 depicts a structure comprising an array of a passive sensors that may be inspected using a drone inspection system in accordance with the present invention. In FIG. 1, the structure is a cell phone tower FIG. 2 depicts a drone inspection system in accordance with the present invention. In FIG. 2, the drone is following a flight path around a structure.

In FIG. 3, the drone is in communication with a HAPS while following a flight path around a structure.

In FIG. 5, the drone is energizing a passive sensor on a structure.

In FIG. 6, the drone is energizing a plurality of passive sensors on a structure using a single energy harvester.

In FIG. 6B, the structure is configured with a plurality of passive sensors that receive power when the drone energizes a single energy harvester.

DETAILED DESCRIPTION

Figure 1:
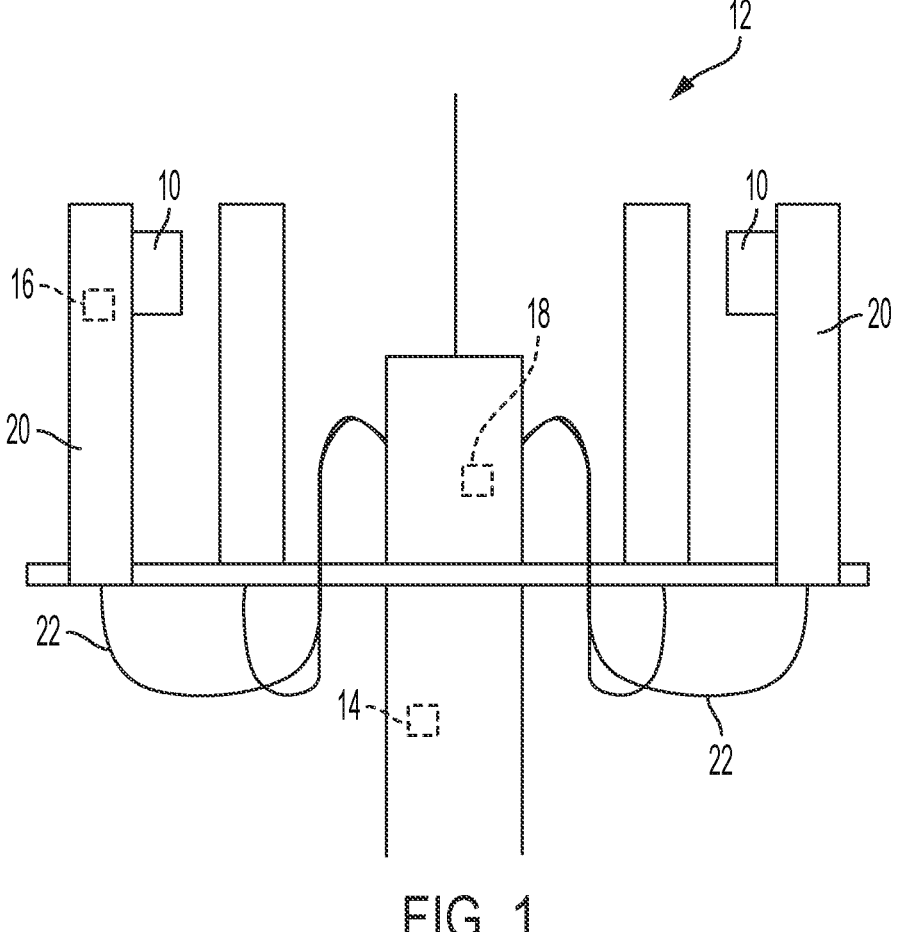

This invention is directed to a drone inspection system for collecting structural condition data about a structure having an array of sensors disposed at various locations on the structure and methods of using such a drone system. The drone inspection system leverages neural networks to calculate a drone flight path to classify passive sensors and other parts of the environment, identify their location, and calculate a drone flight path to collect structural condition data about the structure using sensors mounted on the drone that can obtain information from passive sensors on the structure that are within the drone's "line of sight" in order to generate a digital twin. A digital twin is a virtual representation of structure or system that spans its lifecycle, is updated from real-time data, and uses simulation, machine learning and reasoning to help decision-making. Some of the sensors disposed on the structure may be passive sensors that comprise energy harvesters and must be energized to report the structural collection data to the drone. In order to energize the passive sensors and obtain readings from them, the drone may have real-time tracking capabilities precise enough to allow it to control both its position at a safe distance from the structure and the aim of an energy transfer module to hit a target as small as a few square inches (the typical size of the energy harvester of a passive sensor). This task is beyond the capability of conventional GPS-waypoint guided drones.

To allow for this level of accurate position guidance, optical flow sensors along with a neural network are leveraged in conjunction with an inertial navigation system for real-time corrections to the drone's flight path. This high level of guidance precision permits efficient collection of line-of-sight sensor data as well as passive sensor data to create dimensionally accurate digital twins of structures that contain structural condition data, for example, the state of corrosion present on the structure, the presence of any cracks or stresses in joints, or other information pertaining to the status of the structure and subject to measurement by the passive sensors. The plurality of line of sight and passive sensor data is processed to generate a dimensionally accurate digital twin that can be analyzed using machine learning algorithms to detect invisible abnormalities with the structure. Passive sensor data and other data may be used by machine learning algorithms to improve identification of potential areas or regions of the structure that may have defects or maintenance issues. Such algorithms can then generate automated maintenance alerts on the current state of the structure. Predicative maintenance alerts can also be generated by comparing historical structural condition data to the current structural condition data.

In some embodiments, alerts or analysis may take the form of a heat map of one or more selected variables (e.g., corrosion) on the digital twin of the structure. Such heat maps can be combined with historical heat maps and predictive algorithms to generate automated maintenance schedules to address potential problems, issues, etc. with the structure before they become emergencies.

An unmanned aerial vehicle (UAV) or "drone" inspection system for addressing the above problems is provided herein. The drone inspection system is for collecting information and/or data about the condition of a structure from one or more passive sensors positioned on or about the structure. The one or more passive sensors may form an array of passive sensors configured to obtain data concerning one or more conditions of the structure at or proximate to the location of each passive sensor. The drone inspection system uses a neural compute engine to classify sensors and other objects in the environment. As used herein, classify means to identify a particular object as being in a specified class of objects. The drone neural compute engine may calculate a certainty when classifying objects based on the information and data obtained by onboard sensors, such as optical flow sensors. For example, the drone may classify an object in the environment as a sensor with a 95% certainty that the object is a sensor.

The drone may use a neural compute engine in conjunction with inertial navigation and GPS positioning to plan a flight path around the structure for the purpose of obtaining structural condition data from the passive sensors. The flight path may be modified based on the drone's ability to obtain line of sight with each targeted sensor. Alternatively the flight path may be modified to maneuver the drone to a single point to energize multiple sensors in a sensor array, as may be provided for the structure. This flight path may be calculated to keep the drone at a safe distance from the structure while utilizing one or more optical flow sensors to aim an energy transfer module or exciter at one or more passive sensor elements. The drone may energize a passive sensor element in the manner described further herein and receive data concerning the condition of the structure from the sensor. Based on the received information, the drone may be programmed, instructed by a human operator, or directed by a neural network to modify the flight path or to obtain additional information from other passive sensors or from on-board sensors.

An array of sensors 10 may be located on or around a structure 12 for obtaining data about the condition of the structure 12. FIG. 1 depicts a cell phone tower, which is a typical structure 12 having sensors for monitoring the structure's 12 condition. Sensors 10 on a cell phone tower are typically deployed to monitor, for example, structural integrity 14, component corrosion 16, and/or paint coating integrity or corrosion 18. Other types of sensors 10 that may be used also include, as non-limiting examples, sensors for crack detection, structural deflection, vibration, temperature differentials, fluid pressure, humidity, magnetic fields, etc.

Figure 6A:
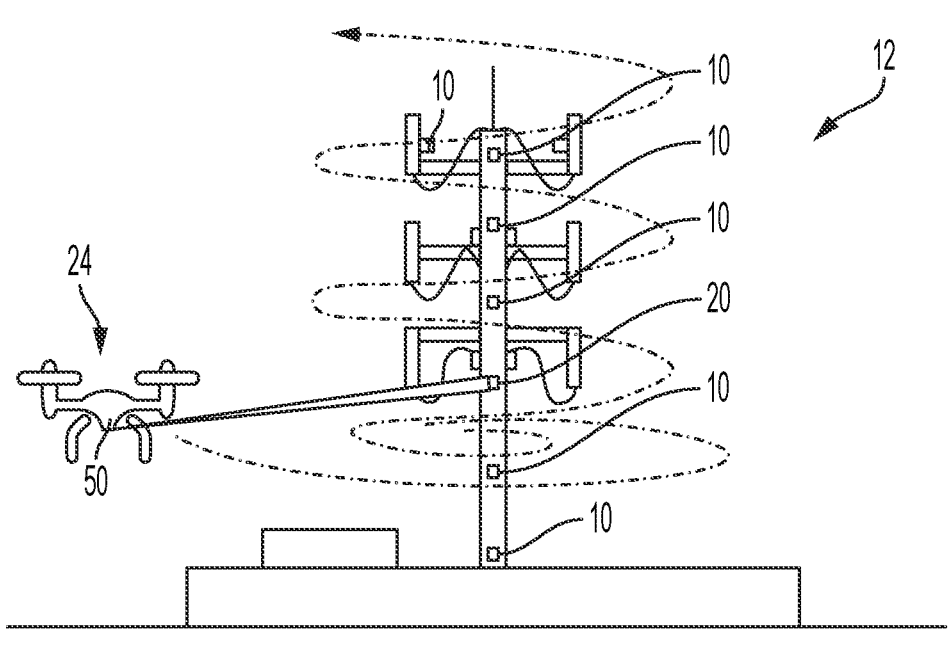
FIG. 6A depicts another drone inspection system in accordance with the present invention.
Figure 6B:
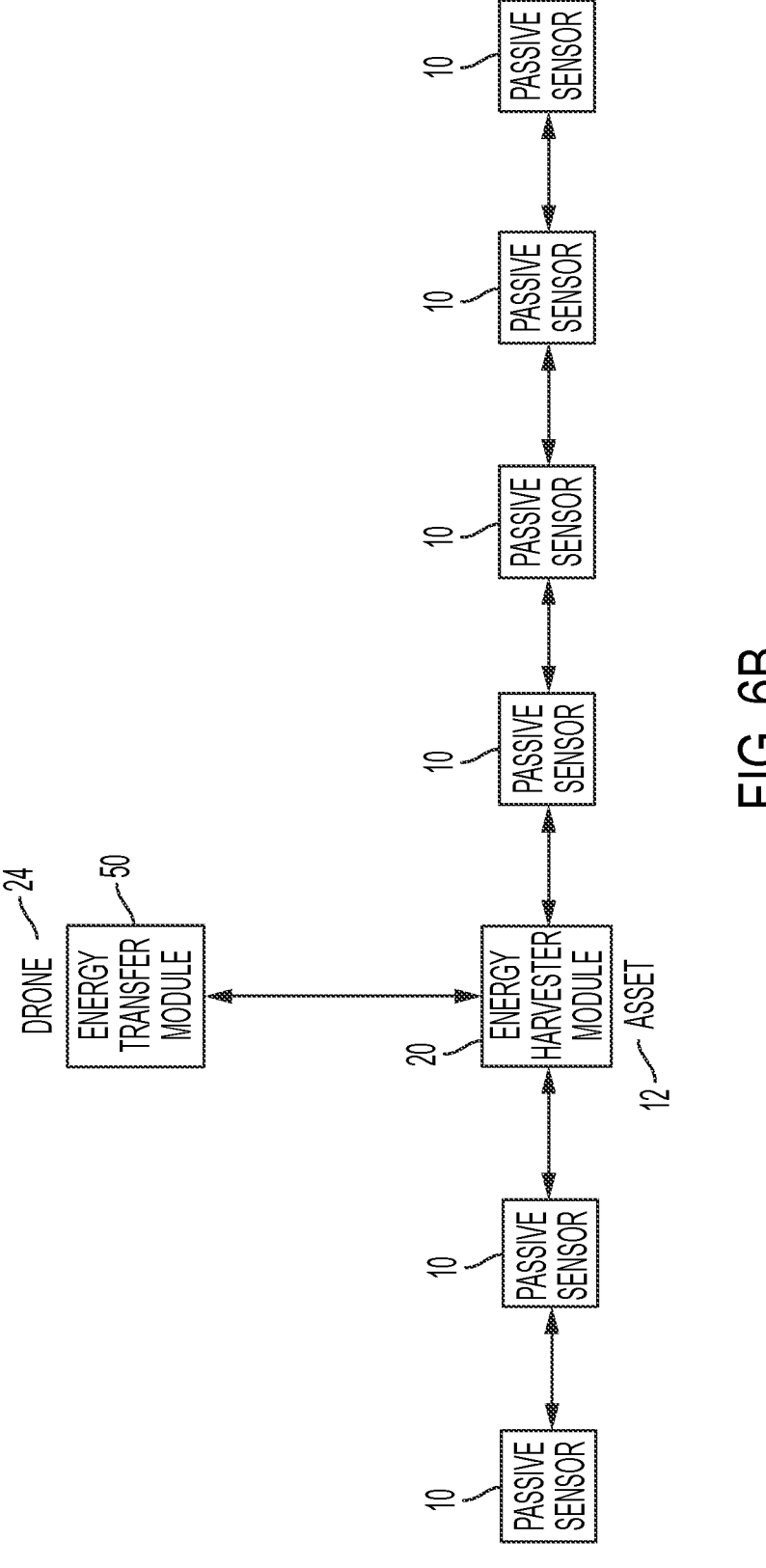
FIG. 6B is a schematic of an exemplary drone inspection system and structure in accordance with the present disclosure.

Sensors 10 are typically placed in hard-to-reach or remote locations. Such sensors 10 are typically passive sensors 10 that only operate upon interrogation or excitation (e.g., from an exciter) to obtain and/or transmit data. Passive sensors 10 are sensors that do not have batteries, hardwired electrical connections, or other means of receiving power on site. Rather, passive sensors 10 may have energy harvesters 20 capable of converting energy from the ambient environment or from an exciter (as may be placed on the drone, as described further herein) into energy usable by the sensor 10. For example, the energy harvester 20 may be a thermoelectric, piezoelectric, photovoltaic, pyroelectric, or electromagnetic energy harvester. The energy harvester 20 may be an integral component of the passive sensor 10 or may be separate from the passive sensor 10. In embodiments where the energy harvester 20 is separate from the passive sensor 10, the energy harvester 20 may be connected to the passive sensor 10 by a wire 22 or other means of providing electric power to the passive sensor 10. As shown in FIGS. 6A-6B, one energy harvester 20 may provide power to a plurality of passive sensors 10. The flight path programming characteristics disclosed herein are particularly suitable for use with passive sensors 10, although a structure 12 may have a combination of both active and passive sensors 10. Unless stated otherwise, the description of the methods and systems herein is with reference to passive sensors 10, but the structure 12 may have active sensors 10 present in addition to passive sensors 10, and the drone may obtain information from both active and passive sensors. Moreover, the use of the methods and systems herein even with active sensors 10 may be particularly desirable when the active sensors 10 need to periodically transmit information or are in difficult or "hard to see" locations.

Figure 2:
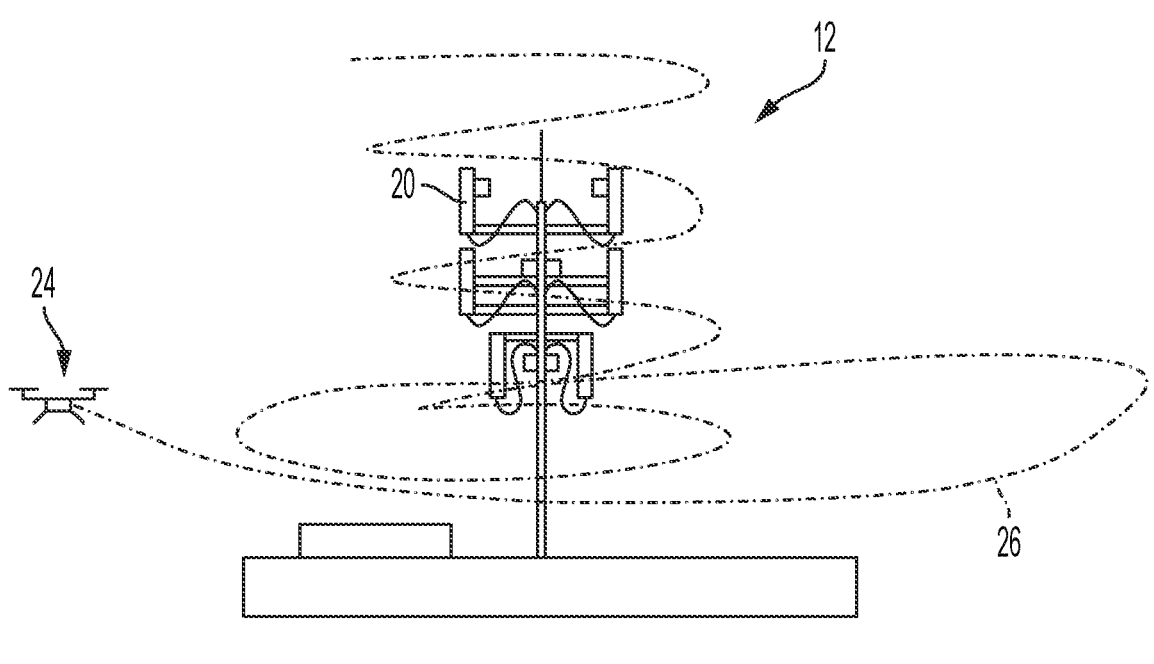

As shown in FIG. 2, the drone 24 may have a preprogrammed flight path 26 for moving around a structure 12 to determine the line-of-sight location of one or more sensors 10 in a array of sensors 10. The drone 24 may be any unmanned aerial vehicle having the onboard equipment and onboard or remote computing capabilities described further herein. It is anticipated that in most applications a quadcopter or octocopter style drone, which are common drones and advantageously have capabilities for hovering in place, would be used, but these specific types of drones are not necessary.

The drone 24 may comprise a drone control unit for directing the flight of the drone 24 in accordance with a flight path 26. The drone control unit is programmed to receive instructions for a flight path 26 determined and/or modified by a neural compute engine 30. The neural compute engine 30 may be provided onboard the drone 24 or it may be located remotely from the drone 24. The neural compute engine 30 may be a module of graphic processing units (GPUs). The graphic processing units may have different configurations (e.g., 16 GB and 32 GB configurations provided on NVIDIA® TESLA v100 TENSOR CORE® GPUs). The selected GPU configuration may alter the performance of the neural compute engine 30. The neural compute engine 30 may run one or more neural networks.

Neural networks 32 are computer algorithms modeled loosely after the human brain and can recognize patterns, learn nonlinear rules, and define complex relationships among data. They can help drones navigate and provide mission support to ensure proper inspection of the structure without data overcollection. A drone 24 in accordance herewith may execute a neural network 32 to assist with inspection, surveillance, reporting, and other missions. The invention may make use of unsupervised "deep learning" neural networks executed onboard low-altitude inspection drones 24. Such a drone inspection neural network 32 may monitor, in real time, the data stream from a plurality of onboard sensors during navigation to an structure 12 along a preprogrammed flight path and/or during its mission (e.g., as it scans and inspects an structure 12). Importantly, the neural network may enable the drone 24 to compensate for GPS drift or other course deviations, or unexpected target anomalies, by enabling target acquisition and locating all assets 12 to be inspected. The neural network may operate similar to the neural network disclosed in U.S. Pat. Pub. No. 2022/0055749, the entire contents of which are hereby incorporated by reference.

The drone 24 also may also have one or more cameras or other visual or geolocating sensors 34 on board for determining the location of the drone 24 and the locations of individual passive sensors 10 on the structure 12. These sensors 34 may include optical flow sensors, RGB cameras, thermal or multispectral cameras, magnetic sensors for PIM analysis, etc.

In addition, the drone 24 may have an agile transceiver array 36 connected to a communications array for communicating with an operator, a high altitude pseudosatellite platform, or other flight control or guidance system; a flight control compute module for on-board flight path calculations or modifications; one or more optical flow sensors; a flight control module comprising an inertial navigation system and a GPS receiver; an energy transfer module or exciter 50 for activating sensors 10; and/or a sensor communications device for receiving data from the sensors 10. The drone may also have a processor array for performing the various computing functions referenced below. The processor array may be a graphical processing unit (GPU), a central processing unit (CPU) or a combination thereof. Given the quantity of optical data and operations that the processes below typically require, a GPU is preferable, but this is not required.

The flight control compute module 40 may receive an initial pre-programmed flight path 26. In some embodiments, the neural network 32 provides the initial pre-programmed flight path 26 to the drone control unit 28. In some embodiments, the flight path 26 may be determined by the neural compute engine 30 based on information provided to the neural compute engine 30 regarding the location of the sensors 10 in the sensor array on the structure. Such information may include initial weight and configuration files that allow for the neural compute engine 30 to compute a flight path 26 around the structure 12 to determine the location of the sensors 10. As used herein, weight files refer to files that train a neural network 32 on the compute engine 30 how to classify data that is processing. Configuration files refer to files that configure the structure or type of neural network 32 that runs on the neural compute engine 30.

The neural compute engine 30 may determine an initial flight 26 path based on known sensor locations, or if no sensor locations are known, then a flight path 26 may be selected for optically scanning the surface of the structure 12 to identify sensor locations. The neural compute engine 30 may also take into account structure geometry and the surrounding operating environment when computing the flight path 12.

Figure 3:
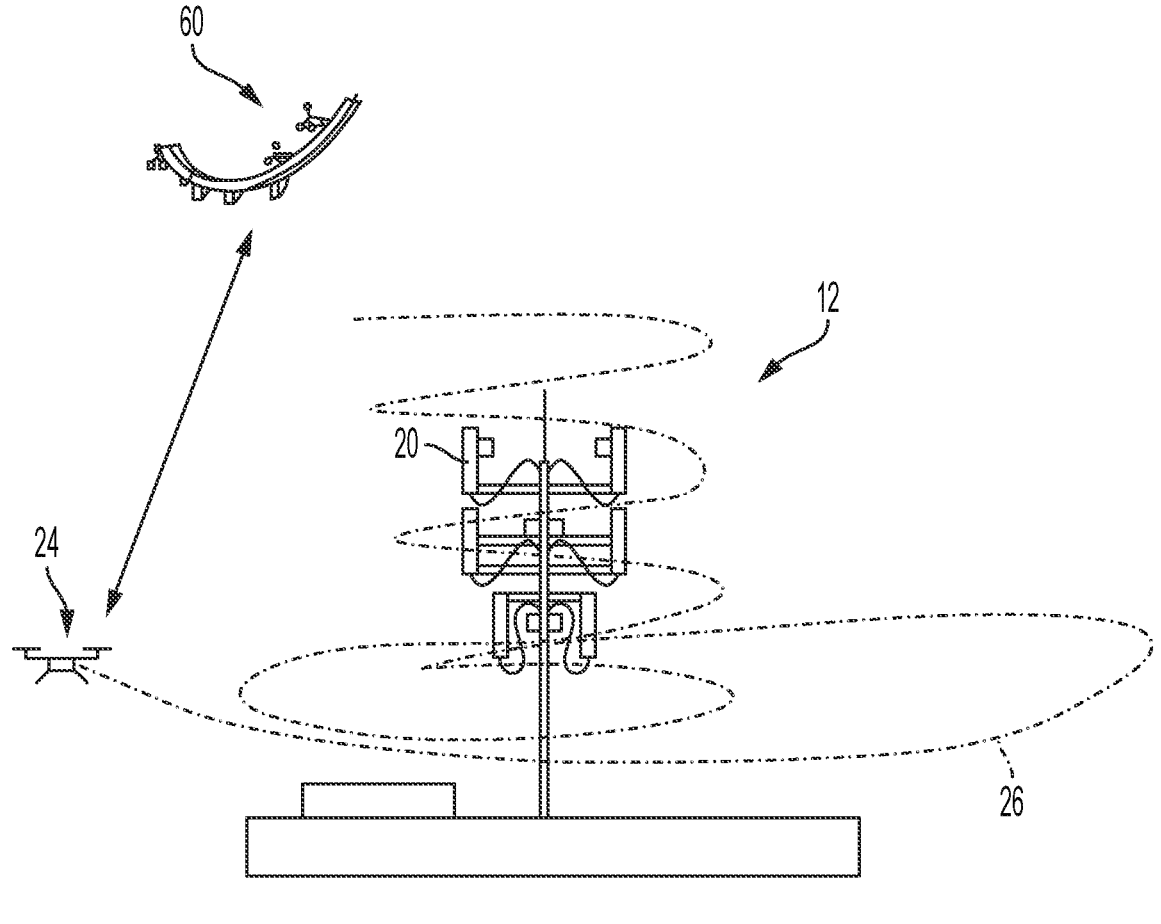
FIG. 3 depicts another drone inspection system in accordance with the present invention.

As shown in FIG. 3, the flight path 26 may be determined by the neural compute engine 30 in communication with a high altitude pseudosatellite (HAPS) vehicle 60, which is an ultralight unmanned aerial vehicle capable of extended flight times and providing geolocation or other functions typically conducted by an artificial satellite in orbit around the earth. The HAPS 60 may be similar to that taught in U.S. Pat. Pub. No. 2022/0058960, the entire contents of which are hereby incorporated by reference. In other embodiments, the flight path 26 may be determined and provided by a human operator, which may be necessary when the structure 12 cannot be easily determined from a single point of view at a near-structure location.

The HAPS 60 may further be used advantageously as a remote neural compute engine or for communicating with land-based computing networks to provide additional computing power, resources, and/or computing networks. The HAPS 60 may have its own HAPS-based neural network compute engine 62 (a HAPSNN) to augment the computing power available onboard the drone 24 (which may be limited due to power constraints onboard the drone). In addition or alternatively, the HAPS 60 may enter a communication network as an intermediate node or relay messages (i.e., act as a transmission link), such as sensor location, between the drone 24 and a terrestrial aviation control system (e.g., UTM and LAANC) or other ground-based air-traffic surveillance infrastructure. The HAPSNN 62 may also facilitate proactive, predictive intercession by the HAPS 60 even if no prior communication with the drone 24 has taken place. Based on stored or acquired knowledge of the terrain and the locations of fixed communication features within the airspace, as well as the computed trajectory of the drone 24, the HAPSNN 62 may recognize the need for communication with the drone 24 and cause the HAPS vehicle 60 to establish a wireless link with the drone 24 and/or a remote terrestrial or cloud computing network or control system with itself as the hub. In embodiments where the drone 24 comprises an agile transceiver array 34, the agile transceiver array 34 may be used to, among other things, connect the drone 24 to the HAPSNN 62.

Figure 4A:
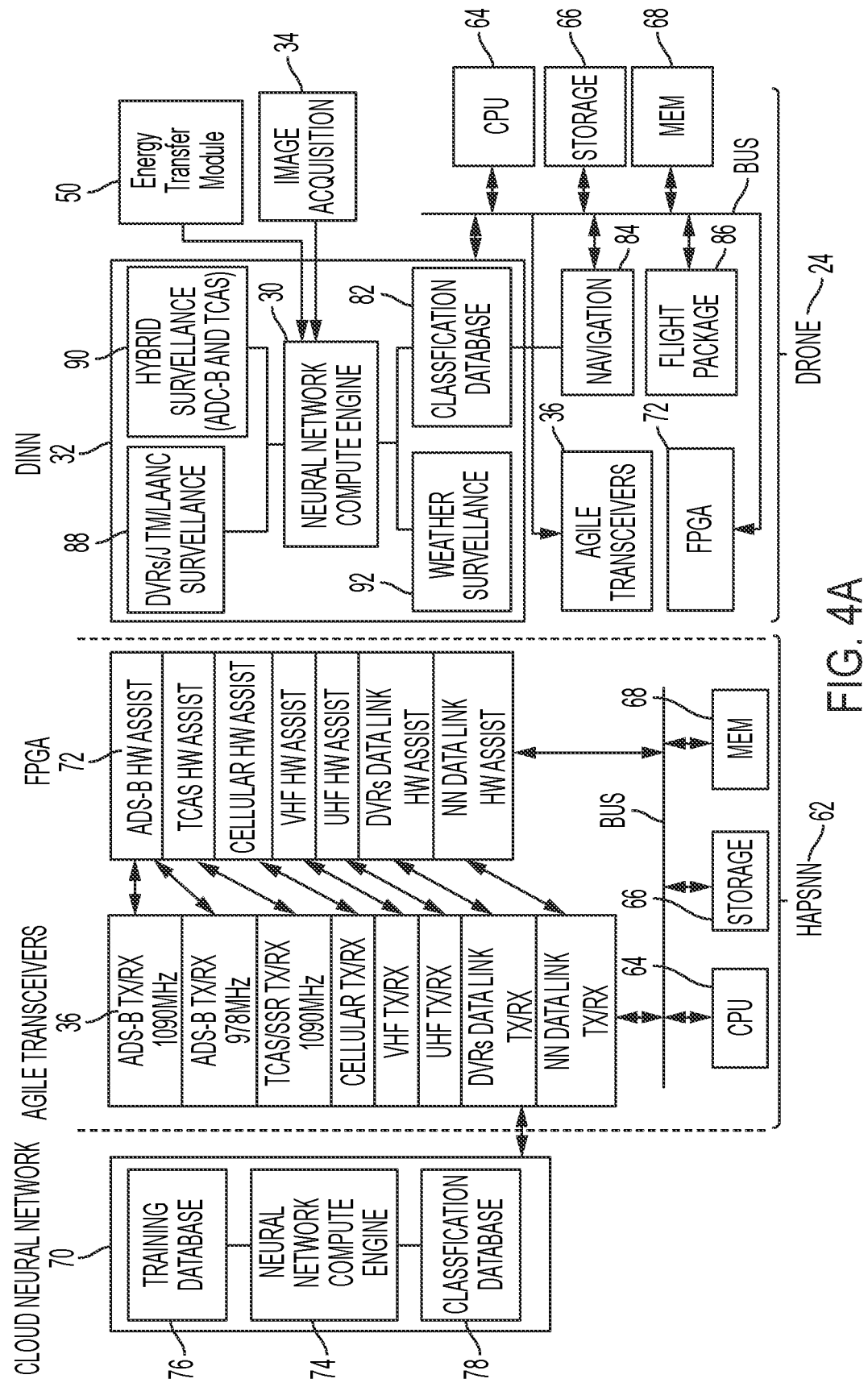
FIG. 4A is a schematic of an exemplary HAPSNN and drone architecture in accordance with the present disclosure.

A representative HAPSNN 62 architecture is depicted in FIG. 4A. In general, a plurality of software subsystems, implemented as instructions stored in a computer memory, are executed by a conventional central processing unit (CPU) 64. The CPU 64 may control the flight and operation of the HAPS as well as the functions described below, or these functions may be allocated among separate processors 64. In addition, for efficient execution of neural-network functionality, the system may include a dedicated graphics processing unit (GPU). An operating system (such as, e.g., MICROSOFT WINDOWS, UNIX, LINUX, iOS, or ANDROID) provides low-level system functions, such as file management, resource allocation, and routing of messages from and to hardware devices (including at least one nonvolatile storage element 66) and the software subsystems, which execute within a computer memory 68. More generally, the HAPSNN 62 may include modules implemented in hardware, software, or a combination of both. For functions provided in software, programs may be written in any of a number of high level languages such as PYTHON, FORTRAN, PAS CAL, JAVA, C, C++, C#, BASIC, various scripting languages, and/or HTML. The software modules responsible for operation of the HAPS vehicle 60, as well as the mechanical and flight features, are conventional and not illustrated; see, e.g., U.S. Pat. No. 10,618,654, the entire contents of which are hereby incorporated by reference.

The HAPSNN 62 includes a neural network module 70, a transceiver module 36, and a field-programmable gate array (FPGA) 72. The transceiver module 36 and the FPGA 72 may constitute, or be part of, a communication facility configured to support airborne communication among flight vehicles and with terrestrial and satellite-based control infrastructure. The HAPSNN 62 may operate in conjunction with the drone's neural compute engine 30. The cloud neural network module 70 may be local to the HAPS vehicle but more typically operates in the cloud, i.e., on a remote (e.g., terrestrial) server in wireless communication with the HAPS vehicle 60 as described below. The modules 36, 72 are typically located on the HAPS vehicle itself.

The cloud neural network module 70 includes a classification neural network 74 that processes images and data received, via agile transceivers 36, from a drone 24 in real time, and which may be passed to the cloud neural network 70. The classification neural network 74 has been trained using a database 76 of training images relevant to the missions that monitored drones 24 will undertake. The classification neural network 74 processes and classifies received images and data and detects (i.e., computes the probability of) anomalies associated therewith. That is, an anomaly may be detected based on something unexpected in a received image or when considered alongside other drone telemetry; for example, an otherwise unexceptional image may trigger an anomaly detection when taken in conjunction with weather conditions reported by the drone 24. When an anomaly is detected, the classification neural network 74 may consult a classification database 78 to determine the proper response; that is, the database 78 includes records each specifying an anomaly and one or more associated actions that may be taken in sequence. If anomalies are detected that do not have a database record, the images may be transmitted for human inspection and classification. New classifications are then added to the training database 76 and used to retrain the neural network 74. The resulting adjusted weights may be propagated, by the cloud server associated with the neural network 70, back to the drone neural compute engine 30. This procedure is described further below.

The agile transceiver package 36 may include one or more subsystems, such as Automatic Dependent Surveillance Broadcast (ADS-B), Traffic Collision Avoidance System (TCAS), Secondary Surveillance Radar (SSR), and Automatic Dependent Surveillance Rebroadcast (ADS-R) subsystems. These subsystems may operate at 978 MHz, 1090 MHz, and 1030 MHz for interrogations, responses, and rebroadcasts. These subsystems enable the HAPSNN 62 to "listen" to the positions of manned air traffic so the neural network 62 can computationally represent nearby traffic in 3D or 2D space and resolve any conflicts between drones 24 and manned air traffic. This can be achieved by broadcasting the position of a drone 24 to manned air traffic or the positions of manned air traffic to the drone 24. Emergency alerts may be issued to manned and/or unmanned traffic with instructions on which way to move to deconflict the airspace.

The agile transceivers 34 may include a cellular network package including 3G, 4G. LTE, 5G or any future telecommunication protocol and bandwidth to support communication links between drones operating in the airspace of the HAPSNN 62, with the terrestrial telecommunications network that some UTM systems utilize, or with backhaul communications channels to transmit data from the HAPS 60 to the cloud-based neural network 70. VHF and UHF transceiver (TX/RX) modules may be used to monitor navigational aids such as VORs, VOR/DMEs or TACANs that enable the neural network 70 to resolve the position of drones 24 as well as of the HAPS 60 using signal time of flight in the event GPS signal is lost. This also enables leveraging satellite communication constellations to transmit or receive data should the need arise. The drone virtual radar (DVR) data link facilitates communication with drone platforms that implement this technology (described, for example, in U.S. Pat. No. 10,586,462, the entire disclosure of which is hereby incorporated by reference) to send and receive air-traffic position information to help resolve conflicts or track drones. The neural network (NN) data link is a dedicated high-bandwidth backhaul channel that enables the HAPSNN 62 to communicate with the drone neural computer engine 30, transmitting real-time data received from one or more drones 24 operating in the monitored airspace and receiving predictions and action instructions obtained from the classification database 78. The FPGA 72 is employed as hardware accelerators to run software that tunes the transceivers 34 and filters out noise.

A representative drone inspection neural network 80, implemented in a drone 24, includes a neural network compute engine 30, a classification database 82, and "backend" code to perform various data-handling and processing functions as described below. In addition, the drone 24 may include a communication facility comprising or consisting of a set of agile transceivers 36 and an FPGA 72, as detailed above. Also, the drone 24 may include a CPU 64, storage 66, and a computer memory 68.

As noted, although the drone inspection neural compute engine 32 may interact with a HAPSNN 62, the drone inspection neural compute engine 32 can exist and operate on its own; that is, a HAPSNN 62 is unnecessary for successful deployment and use of a drone inspection neural compute engine 32. Either way, the systems described above enable the drone 24 to classify objects of interest on an asset 12 it is inspecting (e.g., to locate passive sensors 10 or energy harvesters 20 located on the structure 12), as well as obstacles that it will need to avoid during flight. The neural compute engine 30 is configured to process and classify images received from an image-acquisition device 34, e.g., a video camera on the drone 24. Hence, the neural network 30 may be a convolutional neural network (CNN) programmed to detect and recognize objects in the incoming images. These may be classified based on the neural network's training and the drone inspection neural network 32 (e.g., by application of the back-end code) may consult a classification database 82 to determine the proper response to a detected image. In this case, database 78 includes records each specifying an object associated with some semantic meaning or action. For example, if the neural network 30 detects a tree in an incoming image, the corresponding database entry may identify a tree as an obstacle and trigger an avoidance maneuver that the drone's navigation system 84 executes by controlling the drone's steering and propulsion system. Similarly, if the neural network 30 detects an anomaly consistent with a passive sensor 10, the corresponding database entry may classify the object as a passive sensor 10 and modify the flight path in a manner to fly to a safe distance and line of sight to obtain data from the passive sensor 10. The drone steering and propulsion systems are part of the drone's flight package 86, which include elements typical to a drone 24 such as a power source (e.g., battery), communications platform, the propulsion and steering systems, and an autopilot system.

The drone inspection neural network 32 may also receive data from one or more surveillance systems 88, 90, which may include one or more of DVR, UTM, LAANC, ADS-B and TCAS systems. Although these may be implemented as part of the drone's communication platform, they are illustrated as conceptually within the drone inspection neural network 32 since the neural compute engine 30 may use this data in classifying an image. Similarly, while a weather surveillance system 92 would conventionally be implemented within the drone's communication platform, it is shown as part of the DINN 32 because, once again, weather conditions may be relevant to image classification or database lookup; the same visual scene may prompt different actions depending on the weather, e.g., the drone 24 may give a structure a wider berth under windy conditions.

In embodiments where the drone 24 interacts cooperatively with a HAPSNN 62, the latter may provide further support and more powerful classification capabilities; for example, images with detected objects unclassifiable by the neural network 30 may be uploaded to the HAPSNN 62 for examination, and real-time instructions issued in return by the HAPSNN 62 may be executed by the drone's navigation system 84. Moreover, the HAPSNN 62 may update or supply different weight files for the neural network 30 in real time to better fit the drone's mission based on the classifications that are being made by that drone (and which are communicated to the HAPSNN 62 in real time). The neural network 30 responsively loads these new weight files when received.

Figure 4B:
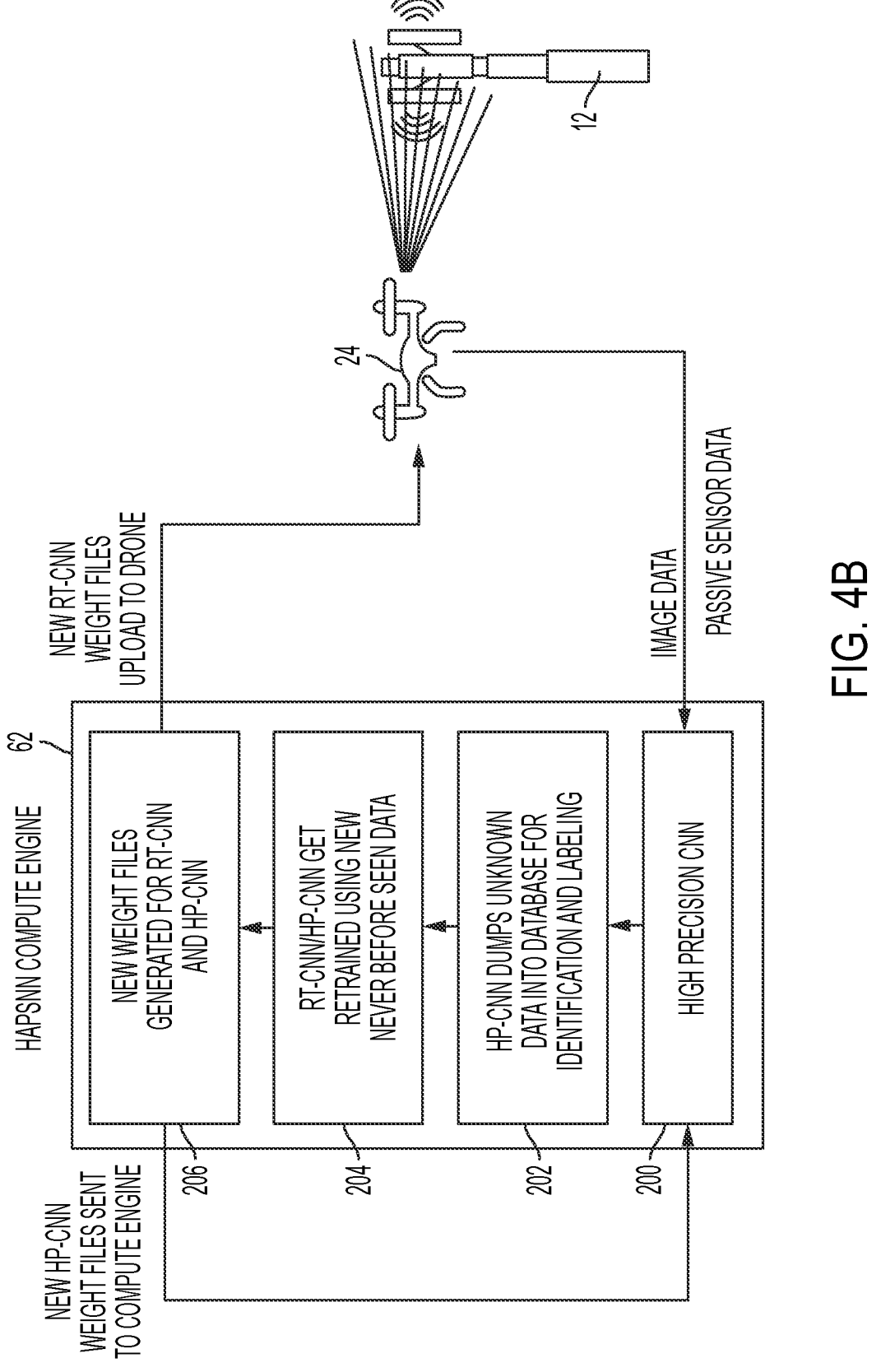
FIG. 4B is a flow chart showing various steps in an exemplary method in accordance with the present disclosure.

This process is illustrated in FIG. 4B. With reference also to FIG. 4A, the drone inspection neural network 32 processes incoming image frames in real time (e.g., –30 frames per second (FPS)) to enable the drone 24 to react fast enough to avoid collisions and to fly around the tower 12. Accordingly, the drone 24 may include a graphics-processing unit (GPU) to support CNN operations. Real-time frame analysis allows the GPU to process the images and classify items on interest on an asset 12 being inspected, notify the back-end code of the classification, and enable the back-end code to execute logic to react to the classification, e.g., if the object is classified as passive sensor 10, the classification database 82 may include instructions for modifying the flight path 26 and saving the passive sensor location for future inspections.

The drone 24 may transmit image data to the HAPSNN, which includes a high-precision CNN (in the compute engine 74 or even within the HAPS 60 itself, if desired) capable of processing, for example, a 60 Megapixel (MP) photographic image each second. The CNN architecture is designed for speed and accuracy of classification by leveraging back-end logic that runs on the compute engine 30. This back-end logic can change the CNN weight and configuration files based on the asset 12 that is being classified based on the first few images of the asset 12 captured by the drone 24. These preliminary images may be collected as part of a "preliminary" flight path 26 around the asset 12 at a safe distance if desired, and may be 60 MP or greater in resolution. These preliminary images are downscaled to the CNN's input image size (e.g., 224×224, or larger depending on the structure to be inspected), and pass through a sequence (of, e.g., 20) convolutional layers, followed by an average pooling layer, and a fully connected layer pretrained to classify different assets 12 (e.g., 100 types of assets). Once the type of asset 12 is identified, the weights and configuration files may be changed and more (e.g., four) convolutional layers are added followed by two fully connected layers to output probabilities and bounding boxes of objects or areas of interest that may be present on the structure. The images uploaded from the drone 24 may be increased in size (e.g., to 448×448) as this type of classification requires more granular detail to be present. The degree of size increase may be dynamically controlled, e.g., scaled up if sufficient detail is not detected for reliable classification.

The fully connected layers predict the class probabilities and bounding boxes of objects (e.g., classification of sensors 10, energy harvesters 20, or other relevant objects identifiable in the images). As an example, the final layer may use linear activation whereas the convolutional layers may use leaky ReLu activation.

Once the back-end logic of the compute engine 30 detects the presence of class and bounding box coordinates, it may switch to and trigger a centroid tracker function to bring that specific classification into the center of the field of view of the drone's image-acquisition device 34. The back-end logic cooperates with a ranging compute engine to resolve the safest flight path 26 for the drone 24 to approach and position the exciter 50 and communications system to energize a harvester 20 and obtain information and data from a passive sensor 10.

In step 200, the HAPSNN CNN ("HP-CNN") processes each image to detect objects therein using a standard object-detection routine (e.g., YOLO), and attempts to classify all detected objects based on its prior training.

In addition to the above HAPSNN and drone data architecture, the drone may comprise a flight control module 44 for identifying a line of sight between the energy transfer module 50 and the sensor energy harvester 20. The flight control module may comprise an inertial navigation system and/or a GPS receiver. The GPS receiver 48 may determine the position of the drone 24 relative to the earth in the operating environment. The heading of the drone 24 may be determined using data from the GPS receiver by calculating the change in position of the drone 24 between readings from the GPS receiver.

The inertial navigation system tracks the accelerations of the drone to measure the movements of the drone 24 in the operating environment. This data may be used to supplement the data from the GPS receiver to determine the position of the drone 24 in the operating environment more accurately. In some embodiments, the inertial navigation system may be configured to determine whether the drone 24 is level or canted. The inertial navigation system may also be configured with one or more barometers to determine altitude and/or one or more magnetometers to determine the heading of the drone 24. Such information may take into account along with other data in calculations involving the drone 24 such as, for example, determining the distance of the drone from the target sensor. The inertial navigation system uses motion and rotation sensors to monitor the position of the drone 24 to allow for real-time corrections to be made to the flight plan. The flight control module may also work in conjunction with the onboard neural compute engine 30 to classify and plan a flight path 26 around the structure 12 for the purpose of obtaining structural condition data from the passive sensors 10.

In the course of maneuvering through the preprogrammed flight path 26, the drone's onboard visual or other locating sensors 34 may determine that one or more passive sensors 10 on the structure 12 do not have direct path/line-of-sight access to the drone 24 based on the preprogrammed flight path 26. In such cases, the neural network 32 uses the drone location data and the known location of the sensor 10 to determine a location at which a direct path or line of sight is available from the drone 24 to the sensor 10. Again, a HAPS platform 60 may also be used in connection with the neural compute engine 30 in the event that the sensor 10 cannot be easily located based on the drone's 24 onboard visual sensors or cameras 34 using the HAPS platform's 60 data link to assist in a more complete view of the structure 12 and surrounding airspace and in acting as a data transfer node to connect the drone 24 to a more powerful cloud-based neural compute engine 74 to assist with detecting sensors 10 that require more advanced algorithms to classify. The GPS receiver 48 and flight control compute module 40 direct the drone 24 along the newly computed flight path 26 until the sensor 10 comes in line of sight with the drone 24.

Optical flow sensors 42 on the drone 24 may be used to locate the exact position of a passive sensor 10. The neural network 32 may be configured to read the optical flow sensor data to determine and provide a specific target for locking onto the precise location of the passive sensor 10 or the precise location of the energy harvester 20 of the sensor 10. In some instances, the determination of the precise sensor location may further require neural network processing. In particular, the weights and configurations for determining an optimal flight path 26 around a structure 12 generally are different from those for optically determining the precise location of a sensor 10 and the energy harvester 20 on the sensor 10. In order to locate sensor 10 and its energy harvester 20, the system provided herein has two options. The first is that the drone 24 may activate the agile transceiver array 36 to communicate with the HAPSNN 62 (and if necessary, through or in connection with the HAPSNN 62 to other remote neural networks on the ground having additional computing power) to determine the location of the sensor 10 and the energy harvester 20 using a different set of weight and configuration files. This is the preferred option if the power resources for performing the neural network processing onboard the drone 24 would result in significant loss of power for other purposes (e.g., communications, powering the exciter, or operating the drone motors during flight). In some instances, the drone GPU or CPU 64 may not have sufficient computing capacity to efficiently determine the sensor 10 and energy harvester 20 locations from the optical flow sensor. In such instances, the onboard processor 64 may initiate communications through the agile transceiver array 36 with the HAPSNN 62 to access the additional computing power onboard the HAPS 60 or on a remote terrestrial or cloud computing network. As a second option, in the event that such additional computing resources are not near at hand, the neural network compute engine 30 may receive a download of new weight and configuration files for determining the location of the sensor 10 and energy harvester 20. By not uploading and utilizing such files until the time for determining precise sensor location, the drone 24 can retain additional working memory and processing power for increasing computing speed and reducing power output.

Once the passive sensor 10 is located and a direct path or line of sight has been acquired, the drone neural compute engine 30 may modify the flight path 26 to maneuver the drone 24 to a safe line of sight for allowing the exciter 50 to be aimed at and energize the passive sensor 10. A safe line of sight may be a line of sight in which the drone 24 is located both a safe distance from a passive sensor 10 and in a safe position with respect to other obstacles or structures 12 in the environment. A "safe distance" and a "safe position" may vary based on a number of factors, including the nature of the structure and the surrounding environment, the local atmospheric conditions (e.g., windy conditions may be programmed to require a larger distance from an obstacle to be in a safe position than still conditions), and/or the drone's 24 ability to maintain the planned flight path 26. These in turn may also change as the predictive power of the neural network compute engine's flight path planning becomes more accurate over time. Currently, a "safe distance" for an initial inspection and a typical structure under normal operating conditions and still or calm winds is about 15 feet, but this may get smaller with increasing flight plan accuracy based on repeated trials and teaching of the neural compute engine 30 without deviating from this disclosure. Once an initial inspection of a structure 12 has been conducted, the position of the passive sensors 10 and the resolved flight paths 26 are logged. These may be accessed by drones 24 for use in future inspections of this same structure to reduce the scan area and the compute workload required to lock onto the passive sensors 10.

Figure 5:
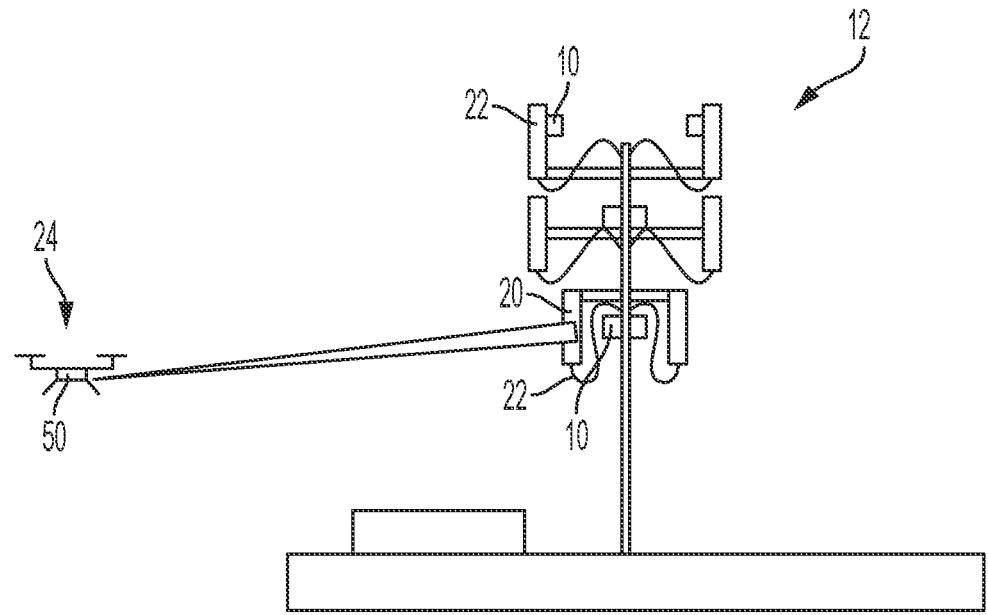
FIG. 5 depicts another drone inspection system in accordance with the present invention.

As shown in FIG. 5, the energy transfer module or exciter 50 may be used to excite and energize a passive sensor 10. In some embodiments, the energy transfer module 50 may be configured to toggle on and off. For example, the energy transfer module 50 is only toggled on once a safe line of sight with the sensor 10 is achieved and is toggled off after the drone 24 receives data from a sensor 10. This may conserve onboard power and extends the duration of the drone's flight operations. Nonlimiting examples of energy transfer modules or exciters 50 include beamformed radio frequency (RF) exciters and infrared (IR) laser exciters. The energy transfer module 50 may only need to be operable for a few seconds for the sensor 10 or array of sensors 10 to provide data.

The drone 24 may comprise a payload guidance system 56 to target or aim the energy transfer module at a sensor. The payload guidance system 56 may be configured to rotate the energy transfer module 50 vertically and horizontally. The payload guidance system may be configured to broaden or narrow the beam from the energy transfer module 50. Moreover, the payload guidance system may be configured to stabilize the energy transfer module 50 to prevent small movements of the drone 24 from moving the energy transfer module 50 off target from the sensor 10.

Upon excitement by the drone 24, the sensor 10 may operate a transceiver to transmit data to the sensor communication device 52 on the drone 24. The sensor 10 may have stored data from prior readings that are to be transmitted to the drone transceiver 36. The sensor 10 may obtain data or take an instrument reading (e.g., temperature, magnetic field strength, humidity, corrosion, stress, orientation, etc.) at the moment of excitement and is otherwise completely passive.

The drone 24 may comprise a sensor communications device for receiving data from the sensor 10. The sensor communications device may be a communications array or transceiver. Further, the sensor communications device may be separate from or integral with another communications device on the drone, such as the agile transceiver array 36.

After receiving data from a passive sensor 10, the drone 24 may continue on its predetermined flight path 26 (as possibly modified by the neural compute engine) to obtain data from additional passive sensors 10 located on the structure 12. In other embodiments, the drone's neural compute engine 30 may be operable to determine that the data provided by the sensor 10 is anomalous in some fashion, which may necessitate further inspection. For example, a deflection sensor 10 on a cell phone tower 12 may provide data indicating that the location has deflected an unusual amount relative to a prior reading, indicating that there may be a structural weakness or deformity near that location. If such an anomaly is identified, the drone's neural network compute engine 30 may determine that it is necessary to obtain additional data regarding the location and may activate one or more onboard sensors 34 on the drone, such as an optical flow sensor, RGB cameras, thermal or multispectral cameras, magnetic sensors for PIM analysis, etc. to further inspect the location.

The systems and methods described herein have at least the following advantages. The system provides a nearly or fully autonomous drone 24 under the operation of a neural compute engine 30 for the purpose of locating and receiving data from passive sensors 10 situation around a structure 12 while collecting data to generate a digital twin of the structure 12, that is, a virtual representation of the structure acting as a real-time virtual counterpart to and/or model of the physical structure itself. The neural compute engine 30 is capable of determining a flight path 26 and modifying the flight path 26 in response to information concerning the location of sensors 10 and the ability to safely obtain data from such sensors 10. The ability to excite passive sensors 10 reduces or eliminates the need for on-sensor power storage or operation. Reducing the time of operation of the energy transfer module 50 also reduces power consumption onboard the drone 24, thereby extending operation time.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

I claim:

1. An unmanned aerial vehicle (UAV) system for collecting structural condition data of a structure having an array of passive sensors at various locations on the structure, each passive sensor energized by an energy harvester, the system comprising:
   a UAV navigation system;
   a UAV image acquisition device;
   a UAV agile transceiver array;
   a computer memory;
   a drone inspection neural network including a neural compute engine;
   a UAV energy transfer module targetable to energize an energy harvester such that when energized, the energy harvester energizes a one of the passive sensor; and
   a UAV communications device for receiving data from an energized sensor,
   wherein the neural compute engine is configured to use real time data from one or more of the UAV image acquisition device, the UAV agile transceiver array, or the UAV navigation system as inputs to a neural network computationally trained to
   (a) classify a passive sensor or energy harvester on an asset,
   (b) calculate a revised flight path for the UAV system to create a line of sight between the UAV energy transfer module and the energy harvester,
   (c) aim the energy transfer module at the energy harvester, (d) detect anomalies in UAV asset inspection data and passive sensor data in real time; and wherein the neural compute engine is further configured to request and receive neural network weight and configuration file updates in real time in response to anomalies detected in UAV asset inspection data and passive sensor data in real time, classify new anomalies that do not have a database record, and to calculate the revised flight path for further inspection of the asset and anomaly.

2. The UAV system of claim 1, wherein the UAV navigation system comprises a flight control module including an inertial navigation unit and a GPS receiver, wherein the neural compute engine is configured to utilize real time data to compute a minimum line of sight distance between the energy transfer module and the energy harvester that places the UAV system in a safe position relative to the structure or any obstacle.

3. The UAV system of claim 2, wherein the flight control module and the neural compute engine are configured to guide the UAV system safely to a distance of approximately 15 to 30 feet from the structure.

4. The UAV system of claim 2, wherein the GPS receiver is configured to navigate the UAV system between the passive sensors, and wherein the neural compute engine is configured to classify the passive sensors and the position of the passive sensors relative to the UAV system to identify a safe line of sight between the energy transfer module and the energy harvester.

5. The UAV system of claim 2, wherein the GPS receiver is configured to navigate the UAV system around the structure to collect data from multiple passive sensors and the neural compute engine is configured to assist the UAV system in obstacle avoidance.

6. The UAV system of claim 2, wherein the GPS receiver is configured to navigate the UAV system between passive sensors having energy harvesters that are at least one mile apart.

7. The UAV system of claim 1, wherein the neural compute engine is configured to determine the location of the passive sensors according to the initial weight and configuration files.

8. The UAV system of claim 1, wherein the neural compute engine is configured to determine and modify a flight path around the structure to maneuver the UAV system to obtain a line of sight between the energy transfer module and the energy harvester of a passive sensor.

9. The UAV system of claim 1, wherein the UAV system further comprises an agile transceiver array configured for communication with a remote neural compute engine, wherein the onboard neural compute engine is configured to receive new weight and configuration files for locating the energy harvester, and wherein the onboard neural compute engine is configured to use the agile transceiver array to transmit data to and receive data from the remote neural compute engine to assist in classifications.

10. The UAV system of claim 9, wherein the neural compute engine of the UAV system is configured to communicate with a cloud-based neural compute engine to assist in determining the revised flight path for the UAV system to reach a safe line of sight with the energy harvesters.

11. The UAV system of claim 1, wherein the neural compute engine of the UAV system is configured to communicate with a High-Altitude Pseudo Satellite (HAPS)-based neural compute engine to assist in determining the revised flight path for the UAV system to reach a safe line of sight with the energy harvesters.

12. The UAV system of claim 1, wherein the energy transfer module is RF-based.

13. The UAV system of claim 1, wherein the energy transfer module is laser based.

14. The UAV system of claim 1, further comprising a High-Altitude Pseudo Satellite (HAPS) in communication with the UAV system to bridge the neural compute engine of the UAV to a cloud-based neural compute engine to-assist the UAV system by relaying energy harvester locations or classifications.

15. The UAV system of claim 1, wherein the energy transfer module is configured to toggle on and off.

16. The UAV system of claim 15, wherein the energy transfer module is toggled on after the UAV system is in a safe position and the energy transfer module is able to establish a line of sight to a energy harvester, and wherein the energy transfer module is toggled off after receiving the sensor data.

17. The UAV system of claim 1, wherein the UAV system further comprises a payload guidance system configured to target the energy transfer module at a sensor harvester.

18. The UAV system of claim 1, wherein the energy transfer module is targetable to energize an energy harvester such that when energized, the energy harvester energizes a plurality of passive sensors.

19. The UAV system of claim 1, wherein the UAV system energy transfer module is configured to collect data from a plurality of passive sensors energized by a single energy harvester.

20. The UAV system of claim 1, wherein a HAPS-based or cloud-based neural compute engine provides additional computing power to the UAV system, on demand, in real time.

21. The UAV system of claim 1, wherein the agile transceiver array is configured to interact with airborne and terrestrial control systems.

22. A method for collecting structural condition data of a structure having an array of passive sensors at various locations on the structure, each passive sensor energized by an energy harvester, the method comprising the steps of:

providing an unmanned aerial vehicle (UAV) having a UAV navigation system, a UAV image acquisition device, a UAV agile transceiver array, a computer memory, and a drone inspection neural network including a neural compute engine, wherein the neural compute engine is configured to request and receive neural network weight and configuration file updates in real time in response to anomalies detected in UAV asset inspection data and passive sensor data in real time, classify new anomalies that do not have a database record, and to calculate a revised flight path for further inspection of the asset and anomaly;

providing a UAV energy transfer module targetable to energize an energy harvester;

providing a UAV communications device for receiving data from an energized sensor;

obtaining real time data from one or more of the UAV image acquisition device, the UAV agile transceiver array, or the UAV navigation system;

using the real time data as inputs to the drone inspection neural network to classify a passive sensor or energy harvester on an asset;

using the real time data as inputs to the drone inspection neural network to calculate the revised flight path for the UAV system to create a line of sight between the UAV energy transfer module and the energy harvester;

using the real time data as inputs to the drone inspection neural network to aim the energy transfer module at the energy harvester; and using the real time data as inputs to the drone inspection neural network to detect anomalies in UAV asset inspection data and passive sensor data in real time.

23. The method of claim 22, wherein the UAV navigation system comprises a flight control module including an inertial navigation unit and a GPS receiver, and wherein the neural compute engine is configured to utilize real time data to compute a minimum line of sight distance between the energy transfer module and the energy harvester that places the UAV system in a safe position relative to the structure or any obstacle.

24. The method of claim 23, further comprising the steps of:

navigating the UAV system between the passive sensors; and classifying the passive sensors and the position of the passive sensors relative to the UAV system to identify a safe line of sight between the energy transfer module and the energy harvester by means of the neural compute engine.

25. The method claim 22, wherein the neural compute engine is configured to determine and modify a flight path around the structure to maneuver the UAV system to obtain a line of sight between the energy transfer module and the energy harvester of a passive sensor.

26. The method of claim 22, wherein the neural compute engine of the UAV system is configured to communicate with a High-Altitude Pseudo Satellite (HAPS)-based neural compute engine to assist in determining the revised flight path for the UAV system to reach a safe line of sight with the energy harvesters.

27. The method of claim 26, wherein the neural compute engine of the UAV system is configured to communicate with a cloud-based neural compute engine to assist in determining the revised flight path for the UAV system to reach a safe line of sight with the energy harvesters.

28. The method of claim 22, further comprising the steps of:

providing a High-Altitude Pseudo Satellite (HAPS) in communication with the UAV system to bridge the neural compute engine of the UAV to a cloud-based neural compute engine to assist the UAV system; and relaying energy harvester locations or classifications by means of the HAPS.

29. The method of claim 22, further comprising the step of collecting data from a plurality of passive sensors energized by a single energy harvester by means of the energy transfer module.

30. The method of claim 22, further comprising the step of providing additional computing power to the UAV system, on demand, in real time by means of a HAPS-based or cloud-based neural compute engine.

31. The method of claim 22, further comprising the step of the agile transceiver array interacting with airborne and terrestrial control systems.

* * * * *